United States Patent Office 3,642,699
Patented Feb. 15, 1972

3,642,699
FORMATION OF POLYPHENYLENE ETHERS
Glenn D. Cooper, Delmar, and James G. Bennett, Menands, N.Y., assignors to General Electric Company
No Drawing. Filed Aug. 12, 1969, Ser. No. 849,508
Int. Cl. C08g 23/18
U.S. Cl. 260—47 ET
21 Claims

ABSTRACT OF THE DISCLOSURE

A process for the formation of high molecular weight polyphenylene ethers by the oxidative coupling of a phenolic precursor in a reaction system containing a low molecular weight alcohol and a complex catalyst formed from a cuprous salt and a primary, secondary or tertiary amine. The process is characterized by the addition of the alcohol to the reaction system which results in the formation of higher molecular weight polymer in a given reaction time or polymer of comparable molecular weight in substantially decreased reaction time.

BACKGROUND OF THE INVENTION

(1) Field of the invention

This invention relates to the formation of synthetic polymers from phenolic precursors, and more particularly, to the formation of polyphenylene ethers by the self-condensation of phenols in a reaction system containing an alcohol and a complex catalyst formed from a cuprous salt and a primary, secondary or tertiary amine.

(2) Description of the prior art

The polyphenylene ethers and processes for their formation are known in the art and described in numerous publications including U.S. Pats. Nos. 3,306,874 and 3,306,875 of Allan S. Hay; U.S. Pat. No. 3,384,619 of Takeshi Hori et al., and in copending U.S. patent applications Ser. Nos. 807,076 and 807,126 filed concurrently on Mar. 13, 1969, all incorporated herein by reference.

The process of the aforesaid Hay Pat. No. 3,306,875 involves the self-condensation of a monovalent phenolic precursor using a catalyst comprising a tertiary amine-basic cupric salt complex. The phenols which may be polymerized by the process correspond to the following structural formula:

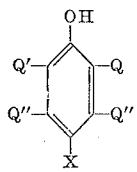

where X is a substituent selected from the group consisting of hydrogen, chlorine, bromine and iodine; Q is a monovalent substituent selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q′ and Q″ are the same as Q and in addition halogen with the proviso that Q, Q′ and Q″ are all free of a tertiary alpha-carbon atom. Polymers formed from the above-noted phenols will correspond to the following structural formula:

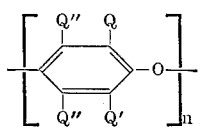

where the oxygen ether atom of one repeating unit is connected to the phenylene nucleus of the next repeating unit, Q, Q′ and Q″ are as above defined; and n is a whole integer equal to at least 100.

According to the process of Hay, the formation of the polyphenylene ethers involves the self-condensation of a phenol in the presence of a catalyst system comprising a tertiary amine-basic cupric salt complex. It is disclosed that the copper salt used to form the complex catalyst is not critical and may be either a basic-cupric salt or a cuprous salt provided that if a cuprous salt is used, it must be capable of existing in the cupric state. When a cuprous salt is used, the catalyst is said to form by oxygen and water reacting with an intermediate tertiary amine-cuprous salt complex thereby forming a tertiary amine-basic cupric salt complex. Various methods are reported for forming the complex catalyst starting with a cupric salt. For example, it s reported that a reducing agent may be used with a cupric salt to form the cuprous salt in situ, which in turn forms the tertiary amine-basic cupric salt complex when admixed with the amine. Alternatively, it is reported that the complex can be formed between a tertiary amine and a basic cupric salt formed by reacting cupric salts with an alkaline salt of a phenol, by treating a cupric salt with an ion exchange resin having exchangeable hydroxyl groups, by adding a base to a cupric salt or by adding cupric hydroxide to a cupric salt. U.S. Pat. No. 3,306,874 of Hay is similar except that primary or secondary amines are used in place of the tertiary amines.

The above-noted U.S. Pat. No. 3,384,619 of Hori et al. is also for a process for the self-condensation of phenols to high molecular weight polyphenylene ethers but differs from the Hay patents in that a catalyst is used comprising a tertiary amine and a non-basic cupric salt. It is claimed that the reaction must be performed in a solvent system containing at least 5 weight percent alcohol in order to obtain high molecular weight polymer. Moreover, in the Hori et al. process, the catalyst concentration in the reaction mixture is excessively high, typically 9 parts amine to 1 part phenol, thereby making the overall process expensive and commercially undesirable. Finally, it is reported in the Hori et al. patent that attempts to form a polyphenylene ether in toluene at these high catalyst concentrations in the absence of alcohol were unsuccessful and no polymer formed.

Commonly-owned copending U.S. patent application 807,126 above-noted is directed to an improved process for the self-condensation of high molecular weight polyphenylene ethers using a complex catalyst formed from a primary or secondary amine and an anhydrous, non-basic cupric salt. The process of this application is characterized by the use of the anhydrous non-basic cupric salts and is an improvement over the Hori et al. patent in that the concentration of catalyst components is small relative to the concentration of monomer and consequently, the overall cost of the process is substantially reduced. Moreover, the process of the application is an improvement over other processes in the prior art in that the molecular weight of the polyphenylene ether formed is higher than otherwise available in a given reaction time or alternatively, the reaction time is shorter for recovery of polymer of comparable molecular weight.

In the above referenced copedning U.S. patent application Ser. No. 807,076, there is disclosed an improvement over the prior art processes for the formation of polyphenylene ethers. This improvement was based upon the discovery that the addition of a small amount of alcohol, typically less than 3% by volume of the total reactants in the system including monomer, catalyst and solvent, permitted the use of hydrated non-basic cupric salts and aqueous solutions of non-basic cupric salts in the preparation of the complex catalyst used for the formation of the polyphenylene ethers. In addition, it was a discovery of that invention that the addition of the alcohol to the reaction system also permitted formation of polymer of higher molecular weight or correspondingly, equal molecular weight in shorter reaction time using anhydrous cupric salts, hydrated cupric salts and aqueous solutions thereof. This was considered an important advantage as the hydrated salts are more readily available than the corresponding anhydrous salts and are lower in cost.

STATEMENT OF THE INVENTION

The present invention is similar to that of copending U.S. patent application Ser. No. 807,076 and is predicated upon the discovery that if a small amount of alcohol, typically less than 3% by weight of the reactants, is added to a reaction system comprising a complex catalyst formed from a cuprous salt and a primary, secondary or a tertiary amine, polymer of higher molecular weight is formed in a given reaction time or correspondingly, equal molecular weight in a shorter reaction time. The process for forming polyphenylene ethers in accordance with the invention comprises passing an oxygen-containing gas through a solution containing the phenolic monomer and the complex catalyst formed in the presence of an alcohol from a primary, secondary or tertiary amine and a cuprous salt.

DESCRIPTION OF THE PREFERRED EMBODIMENTS

The process of the subject invention is broadly applicable to those phenols disclosed in the above-noted Hay patents, but is preferably used with phenols corresponding to the following structural formula:

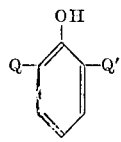

where Q and Q' are as above defined. The most preferred phenols for purposes of the present invention are those where Q and Q' are hydrocarbon radicals having from 1 to 8 carbon atoms. Examples of most preferred phenols include 2,6-dimethylphenol, 2,6-diethylphenol, 2-methyl-6-ethylphenol, 2-methyl-6-allylphenol, 2-methyl-6-phenylphenol, 2,6-dibutylphenol and 2-methyl-6-propylphenol.

The primary, secondary or tertiary amine component of the catalyst complex corresponds to those disclosed in the above-noted U.S. Pats. Nos. 3,306,874 and 3,306,875, representative examples including aliphatic amines including cycloaliphatic amines where the cycloaliphatic group is substituted on the amine nitrogen, for example, mono-, di-, and tripropyl amine, mono-, di- and tributyl amine, mono-, di- and trisecondary propyl amine, mono- and dicyclohexylamine, ethylmethyl amine, morpholine, methylcyclohexylamine, N,N' - dialkylethylenediamines, the N,N'-dialkylpropanediamines, the N,N,N'-trialkylpentanediamines, N,N,N'N' - tetraalkylethylenediamines, etc.

Obviously, mixtures of primary, secondary and tertiary amines may be used if desired. Lower, straight chained dialkylmonoamines such as dibutyl amine and diethylamine are preferred. The concentration of amine in the reaction mixture may vary within wide limits, but is desirably added in low concentrations. A preferred range comprises from about 2.0 to 25.0 moles per 100 moles of monomer.

Typical examples of cuprous salts suitable for the process include cuprous chloride, cuprous bromide, cuprous sulphate, cuprous azide, cuprous tetramine sulfate, cuprous acetate, cuprous butyrate, cuprous toluate, etc. Preferred cuprous salts are the cuprous halides, cuprous bromide being most preferred. The concentration of the cuprous salt is desirably maintained low and preferably varies from about 0.2 to 2.5 moles per 100 moles of phenolic monomer.

In accordance with the present invention, when an alcohol is added to the reaction mixture, the addition of the alcohol results in the formation of higher molecular weight polymer within a given reaction time, or alternatively, polymer of corresponding molecular weight in a shorter reaction time.

The alcohol used in the reaction system is not critical though lower aliphatic alcohols are preferred, exemplary of which are methanol, ethanol, propanol, butanol, allyl alcohol and the like. Methanol is most preferred because this alcohol often is used as an antisolvent in precipitating and recovering the polymer from reaction solution. Consequently, the use of methanol in the reaction system does not add an additional organic compound to the reaction system. The amount of alcohol is preferably maintained low, the alcohol constituting as little as 0.2% by volume of the total reaction system, including monomer, catalyst and solvent, and preferably maintained within a range of from 0.5 to 3.0% by volume of the reaction system.

The polymerization reaction is performed in a solvent of the general class disclosed in the above noted Hay patents, aromatic solvents such as benzene and toluene providing best results. It should be noted that in the Hay patents, it is disclosed that alcohols such as methanol and isopropanol may be added to the reaction mixture when a solvent is used which is not miscible with the water formed during the reaction. The purpose of adding the alcohol is to prevent formation of a separate aqueous phase which, it is disclosed, tends to inactivate the catalyst perhaps by extraction or hydrolysis. The procedure of the subject invention differs from the disclosure of the Hay patents in that in the subject invention, the alcohol is used during the preparation of the catalyst and, in a manner not fully understood, is involved in the formation of the catalyst. In the Hay patents, the alcohol is used in substantially greater concentrations as part of the solvent system to prevent formation of a separate aqueous phase. This is clearly illustrated in Example 6 of Hay patent No. 3,306,875 where n-propanol comprises a portion of the solvent and is used in an amount varying from 93.8 parts of the solvent down to 54.5 parts of the solvent. By way of comparison, the amount of alcohol added to the reaction mixture of the present invention preferably comprises about 3% of the total reactants.

The reaction mixture may contain a promoter such as a diaryl guanidine as disclosed in commonly-owned copending U.S. patent application Ser. No. 806,929, now Pat. No. 3,544,515 or diaryl formamidine as disclosed in commonly owned copending U.S. patent application Ser. No. 807,047, now Pat. No. 3,544,516. In other aspects, the process for forming polymer and the conditions therefor such as temperature, oxygen flow rate and the like are essentially the same as the conditions disclosed in the above-noted Hay patents, though reaction time to generate high molecular weight polymer is reduced. The above noted concentration ranges are preferred, though these ranges may vary to some extent dependent upon oxygen flow rate, reaction temperature and the like. For purposes of economy, lower concentrations of cuprous salt and amine are preferred. It is characteristic of the invention disclosed herein that a reaction system using an alcohol and a complex catalyst formed from a primary, secondary, or tertiary amine and a cuprous salt permits formation of high molecular weight polymer with lower concentrations of cuprous salts and amine than would otherwise be permissible.

The invention will be more fully illustrated by the following examples:

EXAMPLE 1

To a tube type reaction vessel equipped with a Vibro-Mixer stirrer, thermometer and an oxygen inlet tube, there were added 120 ml. of toluene, 0.73 gram (0.010 mole) of n-butylamine and 0.144 gram (0.001 mole) of cuprous bromide. The mixture was stirred and 10.0 grams of 2,6-xylenol (0.082 mole) dissolved in 20 ml. of toluene were added. Oxygen was passed through the stirred reaction mixture for a period of approximately 120 minutes while maintaining reaction temperature at 25° C. The polymerization reaction was terminated with 4 ml. of a 50% aqueous solution of acetic acid, the acid layer was removed by centrifugation and the polymer was precipitated with methanol. The polymer, re-slurried with methanol and vacuum dried, weighed 7.5 grams and had an intrinsic viscosity of 0.38 deciliter per gram (dl./g.) as measured in chloroform at 30° C.

EXAMPLE 2

The procedure of Example 1 was repeated except that 4.2 ml. of methanol was added to the catalyst mixture prior to the addition of the 2,6-xylenol, all other reaction conditions remaining the same. The polymer recovered from the reaction mixture weighed 7.8 grams and had an intrinsic viscosity of 0.49 dl./g. Thus, it can be seen by a comparison of Examples 1 and 2, the addition of the alcohol increased the molecular weight of the polymer (as indicated by the relative intrinsic viscosity).

EXAMPLE 3

Catalyst premix was prepared from 2.87 g. of cuprous bromide, 20.6 g. of di-n-butyl amine, 10 ml. of a solution of 244 g. of 2,6-xylenol in 250 ml. of toluene, and 1275 ml. of toluene. The catalyst was transferred to a three-liter reaction vessel equipped with a thermometer, cooling coils, oxygen inlet tube, and stirred at 1500 r.p.m. by three 2" x ¼" turbines. Oxygen was introduced at a rate of 1.5 cu. ft./hr. and the remainder of the xylenol solution was introduced over a period of twenty minutes followed by 50 ml. of toluene. The temperature was maintained at 26–30° C. by circulating water through the cooling coils. One hour after the beginning of the xylenol addition, 500 ml. of toluene was added and the oxygen flow was reduced to 0.75 cu. ft./hr. Two hours after the beginning of the xylenol addition, 70 ml. of 50% aqueous acetic acid was added and the mixture stirred for five minutes. A portion was withdrawn and centrifuged. The upper layer was decanted and the polymer was precipitated by the addition of two volumes of methanol. The polymer was filtered off, washed with methanol, and dried under vacuum. The intrinsic viscosity, measured in chloroform at 30°, was 0.40 dl./g.

EXAMPLE 4

The procedure of Example 3 was repeated with the addition of 47 ml. (2½% of total reaction volume) of methanol to the catalyst solution before the addition of xylenol. The intrinsic viscosity of the polymer obtained after two hours was 0.45 dl./g.

EXAMPLE 5

The procedure of Example 4 was used with chlorobenzene as the solvent instead of toluene. After two hours, the reaction was killed with 50% acetic acid and the reaction mixture centrifuged. The organic phase was separated and the polymer precipitated by the addition of methanol, yielding 184 g. of poly(2,6-dimethyl-1,4-phenylene) oxide having an intrinsic viscosity of 0.54 dl./g.

EXAMPLES 6–18

This series of experiments was carried out to demonstrate the use of a cuprous bromide-di-n-butyl amine-methanol catalyst on a larger scale, to determine the reproducibility of the process, to examine the effect of changes in the ratio of catalyst components and agitation rate on the polymerization.

Polymerizations were carried out in a 20 gal. Pfaudler stainless steel jacketed reactor equipped with a flat blade shrouded turbine agitator, thermocouple, and oxygen sparge pipe. Temperature control was provided by means of the jacket and by pumping the polymer solution through an external heat exchanger; this pumping also served to increase the degree of agitation of the system. In a typical experiment, a catalyst premix was prepared from 1 liter of 50% 2,6-xylenol solution in toluene, 91 g. of cuprous bromide and 1075 ml. of di-n-butyl amine. The catalyst solution was rinsed into the reactor containing 17 gal. of toluene. The mixture was stirred at 455 r.p.m. while 17 lbs. of 2,6-xylenol dissolved in 3 gal. of toluene, and 1.9 liters of methanol were added. Oxygen was passed into the reaction mixture at a flow rate of 1.7 s.c.f.m. and the solution was pumped through the heat exchanger at a rate of 40 c.p.m. One hour after adding the monomer, the oxygen flow was reduced to 0.4 s.c.f.m. and the temperature raised from 85° F. to 95° F. The polymerization was terminated 150 minutes after the monomer addition with 2.2 liters of 50% acetic acid diluted with 10 gallons of trichloroethylene and the aqueous phase removed by the use of 4 lbs. of Filter Aid. The filtered polymer solution was added to methanol, the polymer isolated by centrifugation, spray rinsed with methanol, reslurried in methanol, recentrifuged, spray rinsed and vacuum dried. The polymer weighed 14.5 lbs. (87% of theory) and had an intrinsic viscosity of 0.49 dl./g.

The general procedure cited above was repeated for a series of polymerizations with the results listed in the following table.

| Example No. | Catalyst ratio [1] | Pumping rate [2] | Intrinsic viscosity [3] (dl./g.) |
|---|---|---|---|
| 6 | 100/1/7 | 0 | 0.29 |
| 7 | 100/1/7 | 8 | 0.30 |
| 8 | 100/1/8 | 8 | 0.33 |
| 9 | 100/1/8 | 40 | 0.36 |
| 10 | 100/1/8 | 40 | 0.35 |
| 11 | 100/1/8 | 40 | 0.36 |
| 12 | 100/1/9 | 40 | 0.38 |
| 13 | 100/1/10 | 0 | 0.42 |
| 14 | 100/1/10 | 8 | 0.43 |
| 15 | 100/1/10 | 40 | 0.48 |
| 16 | 100/1/10 | 40 | 0.49 |
| 17 | 100/1/10 | 40 | 0.48 |
| 18 | 100/1/10 | [4] 40 | 0.42 |

[1] Catalyst ratio—the figure represents the molar ratio of monomer to copper salt to amine.
[2] Pumping rate—this figure represents the rate the reaction mixture was pumped through the heat exchanger.
[3] Intrinsic viscosity—the intrinsic viscosity is set forth in deciliters per gram as measured in chloroform at 30° C. and represents the intrinsic viscosity of the polymer after a reaction time of two hours.
[4] No methanol.

EXAMPLES 19–22

The following examples compare procedures for formation of polyphenylene ether using (1) a complex catalyst of cuprous chloride and an amine (2) cuprous chloride and an amine in the presence of an alcohol (3) cuprous chloride and an amine in the presence of both an alcohol and a diphenylguanidine promoter and (4) cuprous chloride and an amine in the presence of an alcohol and a diphenylformamidine promoter.

In all the examples, the general procedure of example 1 was used. The additives in the catalyst formulation and results obtained are set forth in the following table:

| Example No. | Additive | Catalyst ratio [1] | Methanol, percent | Yield, percent | Intrinsic visc., dl./g. |
|---|---|---|---|---|---|
| 19 | None | 82/1/10/0 | None | 8 | 0.10 |
| 20 | do | 82/1/10/0 | 3 | 84 | 0.23 |
| 21 | DPG [2] | 82/1/10/1 | 3 | 93 | 0.56 |
| 22 | DPF [3] | 82/1/10/1 | 3 | 93 | 0.33 |

[1] Catalyst ratio-molar ratio of monomer to copper salt to amine to additive.
[2] DPG=diphenylguanidine.
[3] DPF=N,N'-Diphenylformamidine.

It should be understood that changes may be made in the embodiments above described without departing from the invention as defined by the following claims.

We claim:
1. A process for the formation of a high molecular weight polyphenylene ether from a monovalent phenol of the formula

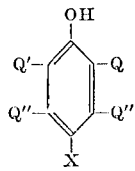

where
X is hydrogen, chlorine, bromine or iodine;
Q is hydrogen, a hydrocarbon radical, a halohydrocarbon radical having at least two carbon atoms between the halogen atom and the phenol nucleus, a hydrocarbonoxy radical, or a halohydrocarbonoxy radical having at least two carbon atoms between the halogen atom and the phenol nucleus; and
Q' and Q" are the same as Q and in addition, halogen, provided that Q, Q' and Q" are all free of a tertiary alpha carbon atom which comprises
    (a) forming a complex catalyst from a cuprous salt, an amine selected from the group consisting of primary, secondary, and tertiary amines, and a low molecular weight alkyl alcohol; and
    (b) oxidatively coupling said monovalent phenol in a solvent in the presence of said complex catalyst; the amount of alcohol in step (a) not exceeding 5% by volume of the reaction mixture including said monovalent phenol, said complex and said solvent.

2. The process of claim 1 where the monovalent phenol corresponds to the formula:

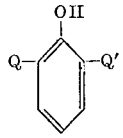

where Q and Q' are monovalent substituents selected from the group consisting of hydrogen, halogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and phenol nucleus.

3. The process of claim 2 where Q and Q' are each alkyl having from 1 to 4 carbon atoms.

4. The process of claim 1 where the alcohol is present within the range of 0.5 and 3.0% by volume of the total reaction mixture.

5. The process of claim 1 where the alcohol is methanol.

6. The process of claim 1 where the monovalent phenol is 2,6-dimethylphenol.

7. The process of claim 6 where the cuprous salt is a cuprous halide.

8. The process of claim 7 where the cuprous halide is cuprous chloride.

9. The process of claim 7 performed in the presence of a promoter selected from the group consisting of a diphenylguanidine and a diphenylformamidine.

10. The process of claim 7 where the cuprous halide is cuprous bromide.

11. The process of claim 7 where the amine is a straight chained aliphatic amine.

12. The process of claim 11 where the amine is di-n-butyl amine.

13. A process for the formation of a high molecular weight polyphenylene ether corresponding to the formula:

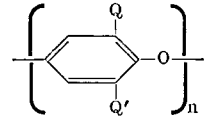

where Q and Q' are monovalent substituents selected from the group consisting of lower aliphatic radicals having from 1 to 4 carbon atoms and phenyl, and $n$ is a whole integer equal to at least 100, said process comprising
    (a) forming a polymerization complex catalyst from a cuprous halide, an amine selected from the group consisting of primary, secondary and tertiary amines and a low molecular weight alkyl alcohol; and
    (b) oxidatively coupling a phenolic precursor in a solvent in the presence of said catalyst, the alcohol in step (a) being present in an amount not exceeding 5% by volume of the reaction mixture including phenol, the complex and solvent.

14. The process of claim 13 where the alcohol is methanol present in an amount of from 0.5 to 3.0% by volume of the total reaction mixture.

15. The process of claim 14 when 2 and 2' are each methyl.

16. The process of claim 15 performed in the presence of a promoter selected from the group consisting of diphenylguanidines and diphenylformamidines.

17. The process of claim 16 where the promoter is diphenylguanidine.

18. The process of claim 17 where the cuprous halide is cuprous chloride.

19. The process of claim 17 where the cuprous halide is cuprous bromide.

20. The process of claim 17 where the amine is an aliphatic monoamine.

21. The process of claim 20 where the amine is di-n-butyl amine.

References Cited
UNITED STATES PATENTS 3,306,874　2/1967　Hay _____ 260—47
3,306,875　2/1967　Hay _____ 260—47

MELVIN GOLDSTEIN, Primary Examiner

CERTIFICATE OF CORRECTION

Patent No. 3,642,699  Dated February 15, 1972

Inventor(s) Glenn D. Cooper and James G. Bennett

It is certified that error appears in the above-identified patent and that said Letters Patent are hereby corrected as shown below:

In Column 8, line 38, "2" should read -- Q --; and "2'" should read -- Q' --.

Signed and sealed this 22nd day of August 1972.

(SEAL)
Attest:

EDWARD M. FLETCHER, JR.
Attesting Officer

ROBERT GOTTSCHALK
Commissioner of Patents